Aug. 6, 1957  N. W. DOORN  2,801,567
DEVICE FOR PROJECTING A PLURALITY OF OPTICAL
IMAGES IN THE SAME FOCAL PLANE
Filed Dec. 10, 1954
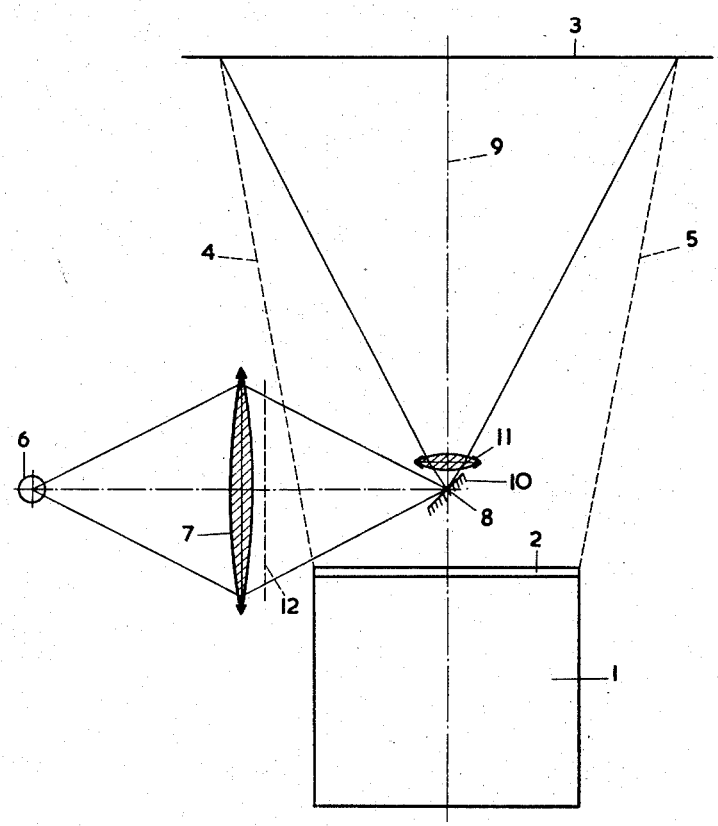
INVENTOR.
Nicolaas W. Doorn
BY

2,801,567

DEVICE FOR PROJECTING A PLURALITY OF OPTICAL IMAGES IN THE SAME FOCAL PLANE

Nicolaas Wilhelmus Doorn, Venlo, Netherlands, assignor to N. V. Nederlandsche Instrumenten Compagnie "Nedinsco," Venlo, Netherlands, a corporation of the Netherlands Application December 10, 1954, Serial No. 474,367

1 Claim. (Cl. 88—24)

This invention relates to a device for projecting two or more optical images in one and the same focal plane, comprising a first projector throwing an image direct in this focal plane and a second projector throwing an image in said focal plane by means of a small mirror which latter image coincides with the former, the image-forming means of the first projector having a large aperture, the second projector being provided with a light-converging element forming a cone of light whose apex is located on the mirror which is obliquely located in the beam of rays of the first projector in or near the optical axis of the objective thereof, the objective of the second projector being located within the beam of rays of the first projector between the mirror and the focal plane without intercepting rays from the first projector.

In the focal plane a screen may be placed.

Owing to the particular arrangement of the objective of the second projector the device according to the invention may be of small dimensions, intercepting only a few rays of the first projector.

It has been proposed before to effect the second projection via a small mirror located in the optical axis of the first projector, but in this known system the objective of the second projector is arranged outside the beam of rays of the first projector and the image of the second projector does not coincide with the image of the first projector, but only small portions of the two images overlap.

According to another known system for projecting two images, each projector is provided with a light-converging optical element, forming a cone of light, the apex of which is located on a mirror which throws the beam of light on an objective which the two projectors have in common.

The invention will be described with reference to the accompanying drawing figure schematically showing a device according to the invention.

In the drawing the reference numeral 1 designates the first projector having an objective 2. Said objective 2 may be a lens or a Schmidt mirror. The screen 3 is rather close to the objective 2 and in this case it is not possible to make a second image coincide with the first image without distortion on the screen 3 by projecting it along the edge of the objective 2. The lines 4 and 5 designate the confines of the beam of rays of the first projector.

In order to form a second image the light of a source of light 6 is bundled into a cone by means of a condensor lens 7, the apex 8 of which cone is located in or adjacent the optical axis 9. In said point 8 which is located rather close to the objective 2 there is a small mirror 10, the objective 11 being arranged between the mirror 10 and the screen 3 in such a manner that said objective does not intercept rays from the first projector. The objective 11 throws a sharp image of a diapositive 12 or another object located close to the condensor lens 7, on the screen 3 between the lines 4 and 5.

The objective 11 being located in or adjacent the optical axis of the objective 2, the advantage is obtained that the diapositive 12 can be arranged close to the boundary of the beam of rays of the first projector, so that a more compact arrangement is possible. This is achieved without the loss of more rays of the first projector than if only the mirror 10 were positioned in the optical axis 9. On the diapositive a network of co-ordinates may be formed, which is superposed on the image which is thrown on the screen 3 by the first projector 1.

As already stated in the introduction it is also possible to combine more than two projectors, the objectives of the second, third, etc. projector being arranged about and close to the optical axis of the objective of the first projector.

I claim:

A device for projecting two or more optical images in one and the same focal plane, comprising a first projector throwing an image direct in said focal plane and a second projector throwing an image in said focal plane by means of a relatively small mirror which latter image coincides with the former, the image-forming means of the first projector having a relatively large aperture, the second projector being provided with a light-converging element forming a cone of light whose apex is located on said mirror which is obliquely located in the beam of rays of the first projector contiguous the optical axis of the objective thereof, the objective of the second projector having a relatively small aperture and being located within the beam of rays of the first projector between the mirror and the focal plane contiguous the optical axis of the first projector.

References Cited in the file of this patent

UNITED STATES PATENTS

| Number | Name | Date |
|---|---|---|
| 1,411,689 | Frederick et al. | Apr. 4, 1922 |
| 1,821,626 | Fleischer | Sept. 1, 1931 |
| 1,899,032 | Handschiegl | Feb. 28, 1933 |
| 2,021,533 | Wolfe | Nov. 19, 1935 |
| 2,061,378 | Henz et al. | Nov. 17, 1936 |
| 2,334,962 | Seitz | Nov. 23, 1943 |
| 2,391,450 | Fischer | Dec. 25, 1945 |
| 2,460,350 | Hinman | Feb. 1, 1949 |
| 2,472,380 | Long | June 7, 1949 |
| 2,489,789 | Korkoz | Nov. 29, 1949 |